United States Patent [19]

Olson

[11] 3,850,412

[45] Nov. 26, 1974

[54] FREQUENCY AND PHASE ACQUISITION IN A COLOR SUBCARRIER REGENERATOR

[75] Inventor: Ronald A. Olson, Beaverton, Oreg.

[73] Assignee: Tektronix, Inc., Beaverton, Oreg.

[22] Filed: Feb. 25, 1974

[21] Appl. No.: 445,518

Related U.S. Application Data

[63] Continuation of Ser. No. 286,107, Sept. 5, 1972, abandoned.

[52] U.S. Cl. .......................... 358/10, 358/19, 324/88
[51] Int. Cl. ............................................. H04n 9/46
[58] Field of Search .. 178/5.4 TE, 5.4 SY, 69.5 CB; 324/88

[56] References Cited

UNITED STATES PATENTS

| | | | |
|---|---|---|---|
| 2,751,424 | 6/1956 | Schlesinger | 178/5.4 TE |
| 3,268,657 | 8/1966 | Peth | 178/69.5 DC |

*Primary Examiner*—Robert L. Griffin
*Assistant Examiner*—George G. Stellar
*Attorney, Agent, or Firm*—George T. Noe

[57] ABSTRACT

In a cathode-ray vectorscope for a PAL television system, a method and means is provided for substantially locking a vector display to the 135° and 225° references when no color burst is present. A front-panel potentiometer furnishes a variable voltage to a voltage-variable capacitance to tune the color subcarrier regenerator oscillator to the subcarrier frequency. A second front-panel potentiometer provides a fine-tuning adjustment, and by quickly manipulating the knob of this potentiometer, a momentary power surge is developed by an associated differentiating network and applied to the voltage-variable capacitance to change the phase of the regenerator subcarrier signal.

9 Claims, 4 Drawing Figures

FREQUENCY AND PHASE ACQUISITION IN A COLOR SUBCARRIER REGENERATOR

This is a continuation of application Ser. No. 286,107, filed Sept. 5, 1972, now abandoned.

BACKGROUND OF THE INVENTION

One of the functions of a subcarrier regenerator circuit in a TV vectorscope is to produce a reference signal matched in frequency and phase to the chrominance subcarrier signal of a color television broadcast to ensure that video color information is processed and displayed without distortion anywhere in the vectorscope system. This is achieved by supplying a sample of the color subcarrier signal, or color burst, as part of the video signal for each television picture line to control the operation of a reference oscillator which regenerates the color subcarrier signal. The color burst, then, is frequently compared to the regenerator oscillator output, and an error signal is developed and fed back to the oscillator, thus locking the oscillator in both frequency and phase to the color burst.

During black-and-white television broadcasts, it is possible to maintain and test the system color-associated equipment by inserting color test signals in off-screen picture lines designated for that purpose. However, since the color burst occurs infrequently, the TV vectorscope display cannot become synchronized with the color subcarrier, resulting in random drifting and rotating of the color-vector display. This problem is particularly annoying in areas where the color testing must be done during black and white transmission, for example, as in those areas served by the PAL system.

SUMMARY OF THE INVENTION

According to the present invention, the frequency and phase of the color subcarrier reference signal in a TV vectorscope can be acquired when a color burst is not available for this purpose. The reference oscillator, for example, a crystal, is designed to operate at or near the color subcarrier frequency. When the subcarrier signal regenerated by this oscillator is exactly at the same frequency and phase as the transmitted chrominance signal, the received chrominance signal can be demodulated without distortion. Also, when the parameters of the regenerated subcarrier signal are correct, a reference vector associated with this signal is locked to its designated polar coordinate on the graticule of a TV vectorscope. The vectors associated with different colors of the spectrum can then be examined as a vector display in reference to the subcarrier signal. It can be seen that if the regenerated subcarrier signal frequency is incorrect, the vectors will be at incorrect angles, or will even be rotating, and the display will be meaningless.

Small changes in frequency of the regenerated subcarrier signal can be made by changing the voltage across a voltage-variable capacitor which is in parallel with the oscillator crystal. During color transmission, these changes are made automatically in response to an error signal derived from a comparison of the oscillator output and the frequently-applied color burst. During black-and-white transmission, the color burst of the inserted test signal occurs too infrequently to be of any use. Therefore, the required control of the oscillator is attained by other means.

A rotating vector display indicates that the regenerated subcarrier sinewave frequency is incorrect. A front-panel potentiomenter is used to apply a variable voltage to the voltage-variable capacitor; when the oscillator frequency is correct, the vector display will be stationary. Then a second potentiometer, for example, one having ten turns, can be used as a fine control to correct minor frequency drift. Also, a differentiating network in the path between the second potentiometer and the voltage-variable capacitor allows the correct phase relationship to be attained. While observing the vector display, the reference vector can be brought to designated polar coordinate by a quick manipulation of the second potentiometer, for example, rapidly turning the knob for about one-half turn and then returning it to its original position. This action produces a momentary power surge in the differentiating network to momentarily change the oscillator frequency, resulting in a change of phase.

It is therefore one object of the present invention to provide means for acquiring the correct frequency and phase of the color subcarrier regenerator when a color burst is not available.

It is another object of the present invention to provide a means for attaining a meaningful vector display in a TV vectorscope.

It is yet another object of the present invention to facilitate checking performance of color equipment in a television system during black-and-white transmission.

BRIEF DESCRIPTION OF THE DRAWINGS

Other objects and advantages of the present invention will be apparent from the following detailed description of a preferred embodiment thereof and from the attached drawings of which

DETAILED DESCRIPTION

Figure 1:
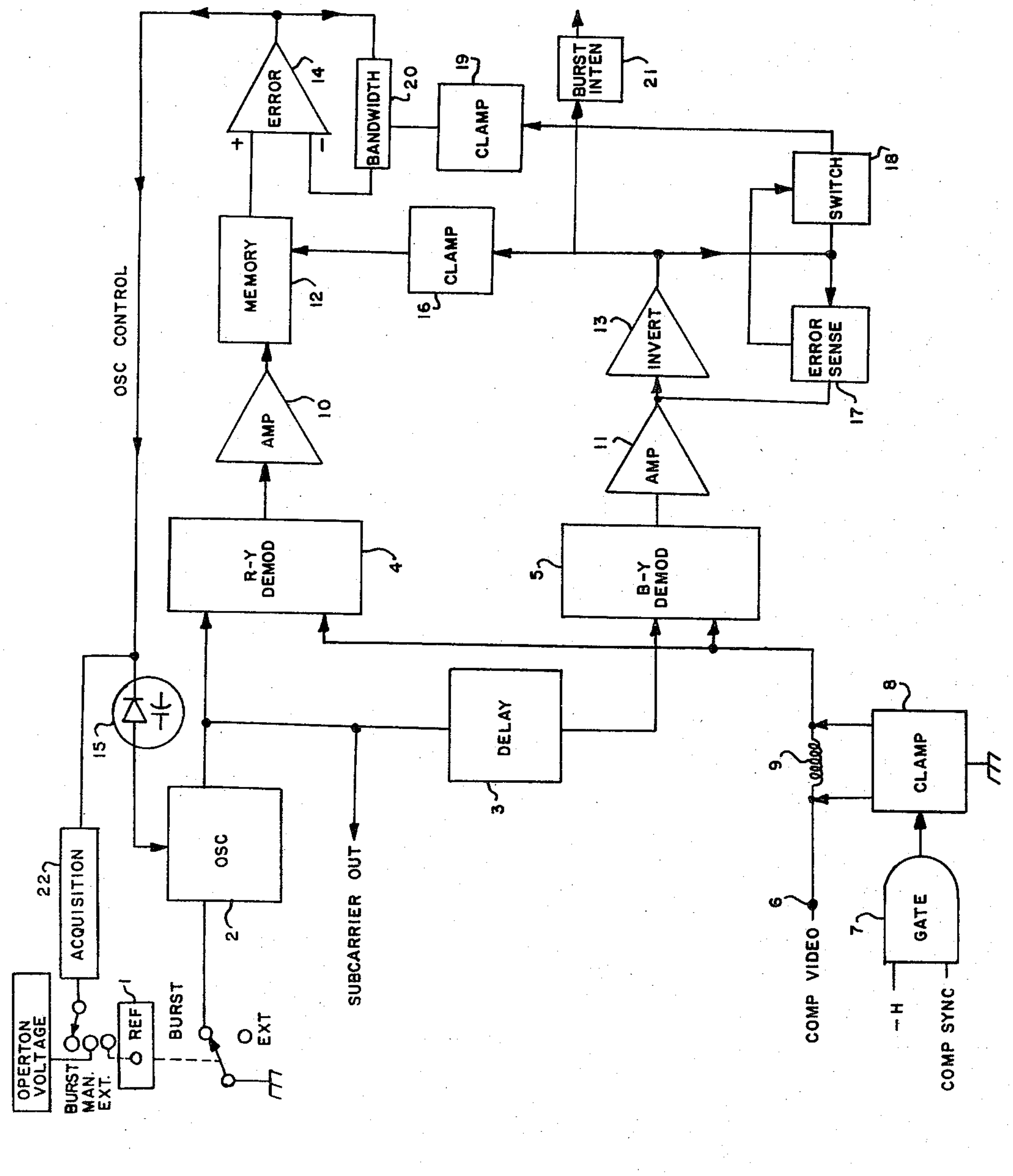
FIG. 1 is a block diagram of a subcarrier regenerator circuit of a PAL vectorscope.

Referring to the block diagram of the subcarrier regenerator in a PAL vectorscope shown in FIG. 1, a phase-reference switch 1 allows three modes of operation; burst, manual, or external. In the burst mode, an oscillator 2 develops a continous sine wave at a frequency of 4.43 megahertz, and is automatically locked in frequency and phase to the color subcarrier signal. In the manual mode, which is the novelty of this invention, oscillator 2 produces the continuous 4.43 megahertz sine wave, and is tuned in frequency and phase to the color subcarrier signal. In the external mode, the subcarrier signal is acquired from an external source, and since this particlar mode is not germaine to the invention, it shall not be discussed further. To give a basic understanding of the subcarrier regenerator circuit, so that the novely may be better understood, the automatic, or burst mode will be described first.

The continuous sine wave signal produced by oscillator 2 is applied to delay circuit 3, which shifts the phase of the signal by exactly 90°. Thus the sine-wave signal is applied in quadrature to the R-Y and B-Y demodulators 4 and 5 respectively. A composite video signal of 63.5 microseconds duration, representing a single line of a television display, is repetitiously applied to an input terminal 6. A small sample of the transmitted color subcarrier signal, or burst, precedes the composite video information for each line, and it is this burst that is of interest. —H timing signals and synchronizing signals are applied to AND gate 7 to operate clamp 8. Clamp 8 clamps the composite video to ground at all times except during burst time. During burst time, the clamp is released, allowing the burst to pass through filter 9 to the R-Y and B-Y demodulators 4 and 5 respectively. Demodulators 4 and 5 compare the oscillator signal to the burst and act as switches. Each is connected such that when the oscillator signal reaches its maximum positive excursion, a voltage corresponding to the phase difference between the oscillator signal and the burst signal is produced at the output of each demodulator. The output of each demodulator is then filtered and amplified by amplifiers 10 and 11 respectively, so that the R-Y demodulator 4 signal drives memory circuit 12, and the B-Y demodulator 5 signal drives an inverting amplifier 13. Error amplifier 14 detects the voltage held in memory circuit 12, which is for example a capacitor, and produces a corresponding error voltage which is fed back to an oscillator-controlling device 15. Device 15 is for example a voltage-variable capacitor which is capable of changing the oscillator frequency incrementally with incremental changes in voltage. After error amplifier 14 has detected the voltage in memory circit 12, the inverted B-Y signal pulses from amplifier 13 drive a clamp circuit 16, which discharges the R-Y voltage in the memory circuit 12. On the next burst, then, the oscillator will have changed frequency slightly and the R-y voltage stored in memory circuit 12 will be less. The overall effect is to automatically bring the oscillator 2 into step with the burst, locked both in frequency and in phase. When the locked condition is reached, the R-Y voltage stored in memory circuit 12 will be zero volts. The error sense 17, switch 18, clamp 19, and bandwith 20 circuits are used to detect an unlock condition, and change the gain-bandwidth characteristic of error amplifier 14, making the system less noise immune during a locked condition, or changes the gain-width of the error amplifier so that lock will occur rapidly. Once the oscillator 2 is matched in frequency and phase to the burst, it becomes a precise regeneration of the color subcarrier and can be used through the vectorscope system where required to process and demodulate the chrominance, or color, television signals. Also, the B-Y signal pulses from amplifier 13 are amplified by amplifier 21 and sent to the Z-axis circuitry to intensify a portion of the displayed reference vector, or burst display.

Figure 4:
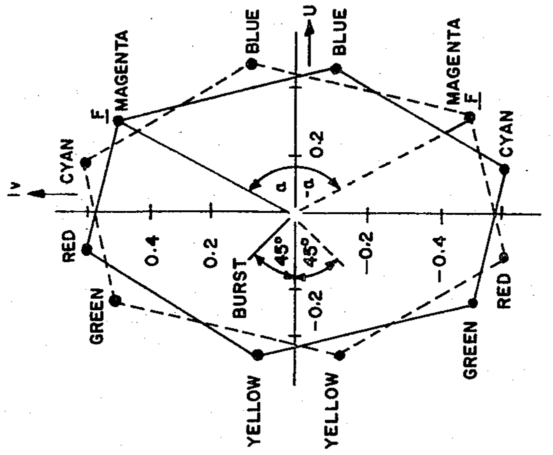
FIG. 4 is a standard color-phase vector diagram showing vector relationship among chrominance components.
Figures 2, 3:
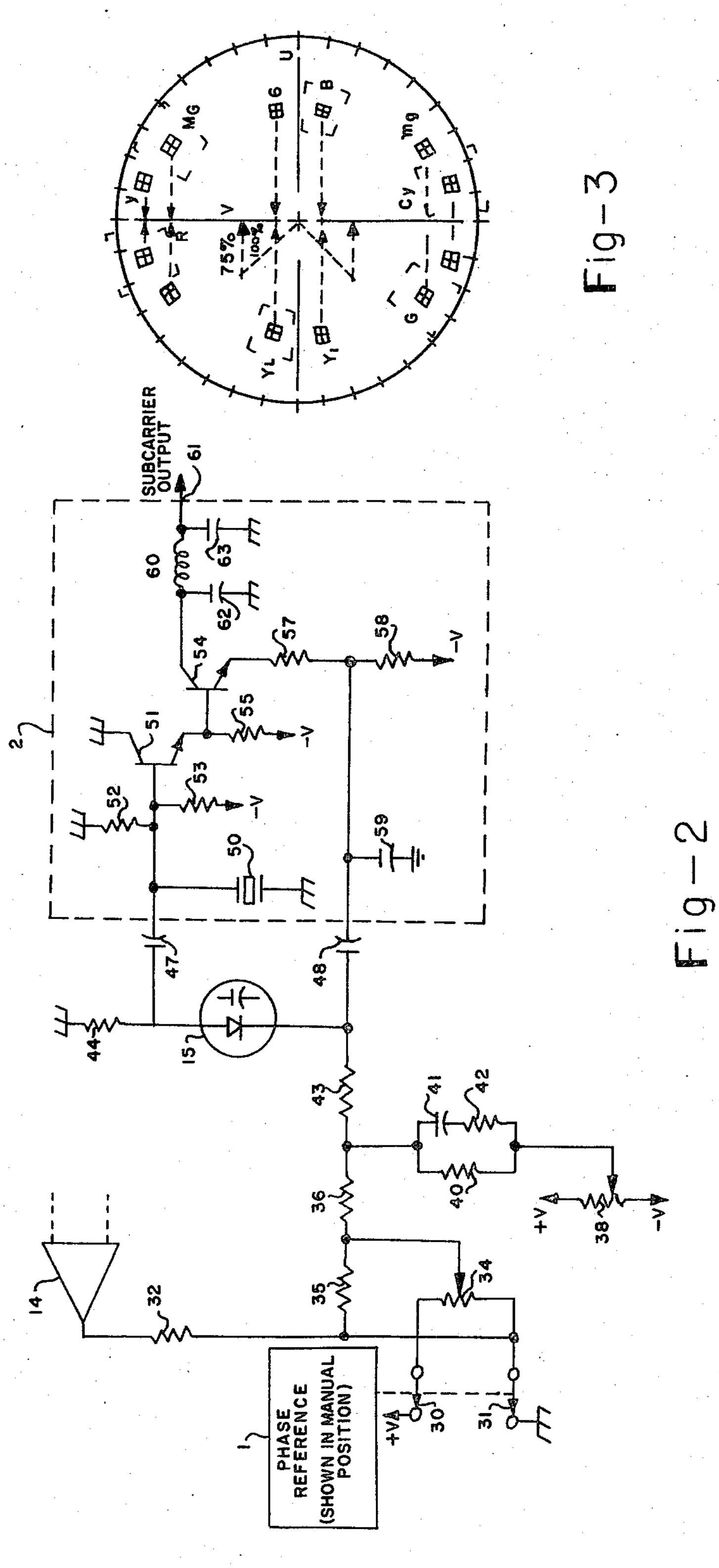
FIG. 2 is a partial schematic of the subcarrier regenerator circuit, showing the details of the alternate frequency and phase locking circuit.
FIG. 3 shows a typical vector graticule associated with the cathode-ray tube display of a PAL vectroscope.

The second mode to be discussed is the manual mode. During black-and-white, or monochrome, television transmission, the color test signals ans associated burst samples are inserted in off-screen lines designated for that purpose. Thus the subcarrier regenerator does not receive the burst with each television-picture line, and automatic locking control is lost. FIG. 4 shows a vector display of the primary colors and their conjugates, and FIG. 3 shows the associated graticule which is affixed to the CRT screen to permit ready observation of the color vectors. Without the reference vector locked to its assigned polar coordinate, the display aimlessly rotates or spins, rendering the display meaningless. In this case, then, the phase-reference switch 1 is placed in the manual position, connecting operating voltages to the alternate frequency and phase acquisition circuit 22. While observing the display, the alternate circuit is tuned using front-panel controls, applying the necessary voltage to the oscillator-control device 15 to bring oscillator 2 into step with the infrequently-occuring burst. The vectorscope operator knows he has attained precise regeneration of the color subcarrier when the display is stable and the reference vector, a portion of which is intensified, is at its correct coordinates.

Turning now to FIG. 2, a schematic of the oscillator control circuit is shown. The phase-reference switch 1 is shown in the manual position, with contacts 30 and 31 connecting to a positive voltage source and ground, respectively. The output of error amplifier 14 is grounded through resistor 32, so that it has no effect on the circuit. The control portion of the circuit is constructed as follow: The center tap of potentiometer 34 is connected to the junction of resistors 35 and 36. A second potentiometer 38 is connected through the parallel combination of resistor 40 and serially connected capacitor 41 and resistor 42 to the junction of resistors 36 and 43. The other end of resistor 43 is connected to the cathode of previously mentioned voltage-variable capacitor 15, whose anode is connected through resistor 44 to ground. The two terminals of voltage-variable capacitor 15 are capacitively through capacitors 47 and 48 to the oscillator circuit 2.

The oscillator circuit is connected as follows: crystal 50 is connected from ground to the junction of capacitor 47 and the base of transistor 51. Also connected to the base of transistor 51 are resistors 52 and 53, the other ends of which are connected to ground and a negative voltage supply, respectively. The collector of transistor 51 is connected to ground, while the emitter is connected to the base of transistor 54. The emitter of transistor 54 is connected to the negative voltage supply through resistors 57 and 58. Coupling capacitor 48 is connected from the cathode of voltage-variable capacitor 15 to the junction of resistors 57 and 58. Capacitor 59 is connected between ground and the junction of capacitor 48 and resistors 57 and 58. The collector of transistor 54 is connected through a coil 60 to an output terminal 61, and a pair of capacitors 62 and 63 are connected between ground and the respective ends of coil 60.

The circuit operates as follows: crystal 50 produces a continuous sine wave at a frequency of about 4.43 megahertz. Emitter follower 51 drives an amplifier 54. Resistors 52, 53, and 55 set the biasing conditions of transistor 51. Frequency of the oscillations is controlled by diode 15, which is used as a voltage-variable capacitor. By causing the voltage across the diode to change, the capacitance of the diode is changed. Voltage-variable capacitor 15, together with the capacities of capacitors 47 and 48, is connected in parallel with the series resistance of base-emitter resistances of transistors 51 and 54, and resistor 57, and this combination forms a variable-impedance load for the crystal 50 to drive into. The output of the oscillator is taken from the collector of transistor 54 and filtered by a pi-type filter consisting of coil 60 and capacitors 62 and 63. A smooth sine-wave signal near the color subcarrier frequency is then available at terminal 61.

As previously mentioned, the sine-wave signal is locked in frequency and phase to the color subcarrier by changing the capacitance of diode 15. Operating conditions for this device are established by the voltage-divider network consisting of resistors 34, 35, 36, 38, 40, 43, and 44. Resistor 42 is chosen to be a resistance value at just a fraction of the resistance of resistor 40 so that when potentiometer 38 is quickly turned, resistor 42 and capacitor 41 provide a low-impedance path for the voltage transient produced. Potentiometer 38 is preferably a 10-turn linear potentiometer capable of producing a small voltage change across diode 15, except when rapidly manipulated. Potentiometer 34 produces a large voltage change across diode 15, thus is used as a coarse control.

It will, therefore, be appreciated that the aforementioned and other desirable objects have been achieved; however, it should be noted that the particular embodiment which is shown and described herein, is intended as merelyl illustrative and not restrictive of the invention.

The invention is claimed in accordance with the following:

1. A system for acquiring the frequency and phase of the subcarrier signal generated by a subcarrier regenerator circuit in a TV vectorscope, comprising:

means for receiving an external composite video signal, said external composite video signal including a burst reference portion;

means for generating a sine-wave signal at or near the subcarrier frequency, said means including a tunable oscillator;

means for comparing said sine-wave signal to said burst portion and producing a first control voltage proportional to the difference therebetween;

means for manually producing a second control voltage; and means for selectively receiving said first control voltage and said second control volage to provide thereoutof a correction voltage for tuning said tunable oscillator.

2. The system according to claim 1 wherein said means for generating a sine-wave signal including a tunable oscillator includes a crystal operable at a predetermined frequency.

3. The system according to claim 1 wherein said means for producing said first control voltage defines an automatic error voltage generator for receiving said external composite video signal and said generated sine-wave signal and developing said first control voltage in response to the frequency and phase difference therebetween.

4. The system according to claim 1 wherein said means for producing said second control voltage includes a main potentiometer and a vernier potentiometer which form a portion of a voltage-divider network.

5. The system according to claim 4 wherein said voltage divider network also includes linear voltage producing elements for providing a linear control voltage and momentary surge voltage producing elements for providing a momentary surge control voltage.

6. The system according to claim 5 wherein said momentary surge producing elements define said vernier potentiometer and a serially-connected resistor and capacitor.

7. The system according to claim 1 wherein said means for selectively receiving said first control voltage and said second control voltage includes a diode which functions as a voltage variable capacitor.

8. A system for acquiring the frequency and phase of a subcarrier signal generated by a subcarrier regenerator circuit in the absence of successive color burst portions of an externally applied composite video signal, comprising:

a tunable oscillator for generating a sine-wave signal at substantially the color subcarrier frequency;

an error-voltage generator for comparing the frequency and phase of said sine-wave signal to the frequency and phase of said color burst portions of said composite video signal and producing an error voltage which is proportional to the difference therebetween;

passive network means for producing a variable D.C. control voltage; and tuning means for selectively receiving said error voltage and said variable control voltage and producing therefrom a correction voltage to tune said tunable oscillator to the frequency and phase of the subcarrier signal.

9. The system according to claim 8 wherein said passive network means includes a main potentiometer and a vernier potentiometer for linearly producing said variable control voltage, said passive network means also including a serially-connected resistor and capacitor for producing a momentary surge in said variable control voltage, and said tuning means includes a voltage variable capacitor.

* * * * *

UNITED STATES PATENT OFFICE
CERTIFICATE OF CORRECTION

Patent No. 3,850,412 Dated November 26, 1974

Inventor(s) RONALD A. OLSON

It is certified that error appears in the above-identified patent and that said Letters Patent are hereby corrected as shown below:

Column 3, line 64, after "Thus" insert --,--

Column 3, line 65, after "not" insert --successively--

Column 3, line 65, after "receive" delete --the--

Column 3, line 65, after "receive" insert --composite video having--

Column 4, line 4, after "coordinate" insert --due to non-successive burst--

Column 4, line 10, after "circuit is" insert --manually--

Column 4, line 10, after "controls," insert --to--

Column 4, line 11, change "applying" to --apply--

Column 4, line 15, after "display" insert --on the CRT screen--

Column 4, line 25, after "tap of" insert --coarse--

Column 4, line 27, delete --second--

Column 4, line 27, before "potentiometer" insert --vernier--

Column 4, line 34, after "capacitively" insert --coupled--

Column 4, line 45, after "through" insert --series--

Column 5, line 15, after "linear" insert --vernier--

Signed and sealed this 22nd day of April 1975.

(SEAL)
Attest:

RUTH C. MASON
Attesting Officer

C. MARSHALL DANN
Commissioner of Patents
and Trademarks